United States Patent
Ko

(10) Patent No.: US 8,571,143 B2
(45) Date of Patent: Oct. 29, 2013

(54) QUADRATURE SIGNAL PHASE CONTROLLER FOR CONTROLLING PHASE

(75) Inventor: Sang Soo Ko, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/488,010

(22) Filed: Jun. 4, 2012

(65) Prior Publication Data
US 2012/0243641 A1 Sep. 27, 2012

Related U.S. Application Data

(63) Continuation of application No. 12/626,134, filed on Nov. 25, 2009, now Pat. No. 8,194,794.

(30) Foreign Application Priority Data

Nov. 27, 2008 (KR) .......................... 10-2008-0118994

(51) Int. Cl.
*H03D 3/22* (2006.01)
(52) U.S. Cl.
USPC .......................................... 375/330

(58) Field of Classification Search
USPC ............. 375/283, 322, 324, 327, 330–331; 455/255, 323
See application file for complete search history.

(56) References Cited

U.S. PATENT DOCUMENTS

| 5,148,128 A | * | 9/1992 | Mazumder | ..................... 332/103 |
| 5,926,750 A | * | 7/1999 | Ishii | ............................... 455/130 |
| 6,496,545 B1 | * | 12/2002 | Liu | ............................... 375/301 |

* cited by examiner

*Primary Examiner* — Khanh C Tran
(74) *Attorney, Agent, or Firm* — F. Chau & Associates, LLC

(57) ABSTRACT

A quadrature signal phase controller includes a first phase shifter and a second phase shifter. The first phase shifter generates phase shifted first in-phase differential output signals and phase shifted first quadrature-phase differential output signals. The second phase shifter generates phase shifted second in-phase differential output signals and phase shifted second quadrature-phase differential output signals. Each of the first and second phase shifters increases or decreases the phase difference between the first in-phase differential output signals and the second quadrature-phase differential output signals, and the phase difference between the second in-phase differential output signals and the first quadrature-phase differential output signals, in response to a change in a level of the first control signal and a change in a level of the second control signal.

14 Claims, 10 Drawing Sheets

QUADRATURE SIGNAL PHASE CONTROLLER FOR CONTROLLING PHASE

CROSS-REFERENCE TO RELATED APPLICATIONS

This application is a continuation of U.S. application Ser. No. 12/626,134 filed on Nov. 25, 2009, now U.S. Pat. No. 8,194,794 which claims priority to Korean Patent Application 10-2008-0118994, filed on Nov. 27, 2008, in the Korean Intellectual Property Office, the disclosures of which are incorporated by reference herein in their entireties.

BACKGROUND

1. Field of the Invention

This invention relates to a wireless communications system, and more particularly, to a quadrature signal phase controller for controlling the phase difference between the in-phase signal and the quadrature-phase signal.

2. Description of the Related Art

Direct conversion receivers have a "zero-IF" structure" in which an intermediate frequency (IF) is 0 Hz (i.e. an IF is not used). The direct conversion receiver employing the zero-IF method or direct conversion method has a simpler circuit structure than a superheterodyne receiver. The direct conversion receiver is easy to be implemented as a single integrated circuit (IC) so the direct conversion receiver may be manufactured to be compact at a low cost.

The zero-IF structure and an image-rejection structure characteristically require an in-phase signal and a quadrature-phase signal that have the same amplitude and 90° delayed phases for signal conversion. However, the in-phase signal and the quadrature-phase signal do not generally have a precise phase difference of 90° due to many factors, for example, the manufacturing process, the supply voltage, or the operating temperature so that the signal-to-noise ratio (SNR) may deteriorate and thus the receiving sensitivity of a receiver may be deteriorated. Thus, there is a need for a quadrature signal phase controller capable of accurately controlling the phase difference between the in-phase signal and the quadrature-phase signal.

SUMMARY OF THE INVENTION

An embodiment of the present invention provides a quadrature signal phase controller that variably controls the phase difference between an in-phase signal and a quadrature-phase signal by using two phase shifters and two control signals.

An aspect of the present invention provides a quadrature signal phase controller that may improve an image rejection ratio and more precisely control characteristics, by variably controlling the phases of an in-phase signal and a quadrature-phase signal.

According to an aspect of the present invention, there is provided a quadrature signal phase controller including: a first phase shifter mixing each of in-phase differential input signal and each of quadrature-phase differential input signals, in response to at least any one of a first control signal and a second control signal, to generate phase shifted first in-phase differential output signals and phase shifted first quadrature-phase differential output signals; and a second phase shifter mixing each of the in-phase differential input signal and each of the quadrature-phase differential input signals, in response to at least any one of the first control signal and the second control signal, to generate phase shifted second in-phase differential output signals and phase shifted second quadrature-phase differential output signals; wherein each of the first and second phase shifters, in response to a change in the voltage level of the first control signal and a change in the voltage level of the second control signal, increases or decreases the phase difference between the first in-phase differential output signals and the second quadrature-phase differential output signals, and the phase between the second in-phase differential output signals and the first quadrature-phase differential output signals.

The first phase shifter may include a first differential amplifier including input terminals configured to receive the in-phase differential input signals, a second differential amplifier including input terminals configured to receive the quadrature-phase differential input signals, and a plurality of first transistors, each controlling, in response to the first control signal, connection between each of output terminals of the first differential amplifier and each of first output terminals to output the first in-phase differential output signals, and controlling connection between each of output terminals of the second differential amplifier and each of second output terminals to output the first quadrature-phase differential output signals.

The second phase shifter may include a third differential amplifier including input terminals to receive the in-phase differential input signals, a fourth differential amplifier including input terminals to receive the quadrature-phase differential input signals, and a plurality of second transistors, each controlling, in response to the second control signal, connection between each of output terminals of the third differential amplifier and each of third output terminals to output the second in-phase differential output signals, and connection between each of output terminals of the fourth differential amplifier and each of fourth output terminals to output the second quadrature-phase differential output signals.

Each of the plurality of first transistors of the first phase shifter, in response to the second control signal, controls the quadrature-phase differential input signals forming at least part of the first in-phase differential output signals, and controls the in-phase differential input signals forming at least part of the first quadrature-phase differential output signals. Each of the plurality of second transistors of the second phase shifter, in response to the second control signal, controls the quadrature-phase differential input signals forming at least part of the second in-phase differential output signals, and controls the in-phase differential input signals forming at least part of the second quadrature-phase differential output signals. The change in the voltage level of the first control signal and the change in the voltage level of the second control signal may be variably controlled and may vary by an inverse relationship.

The attached drawings illustrating exemplary embodiments of the inventive concept are provided to in order to convey a sufficient understanding of the inventive concept and the merits thereof. Hereinafter, the inventive concept will be described in detail by explaining exemplary embodiments of the inventive concept with reference to the attached drawings. Like reference numerals in the drawings denote like elements.

BRIEF DESCRIPTION OF THE DRAWINGS

Exemplary embodiments of the invention will be more clearly understood from the following detailed description taken in conjunction with the accompanying drawings in which.

DETAILED DESCRIPTION OF EXEMPLARY EMBODIMENTS OF THE INVENTION

Figure 1:
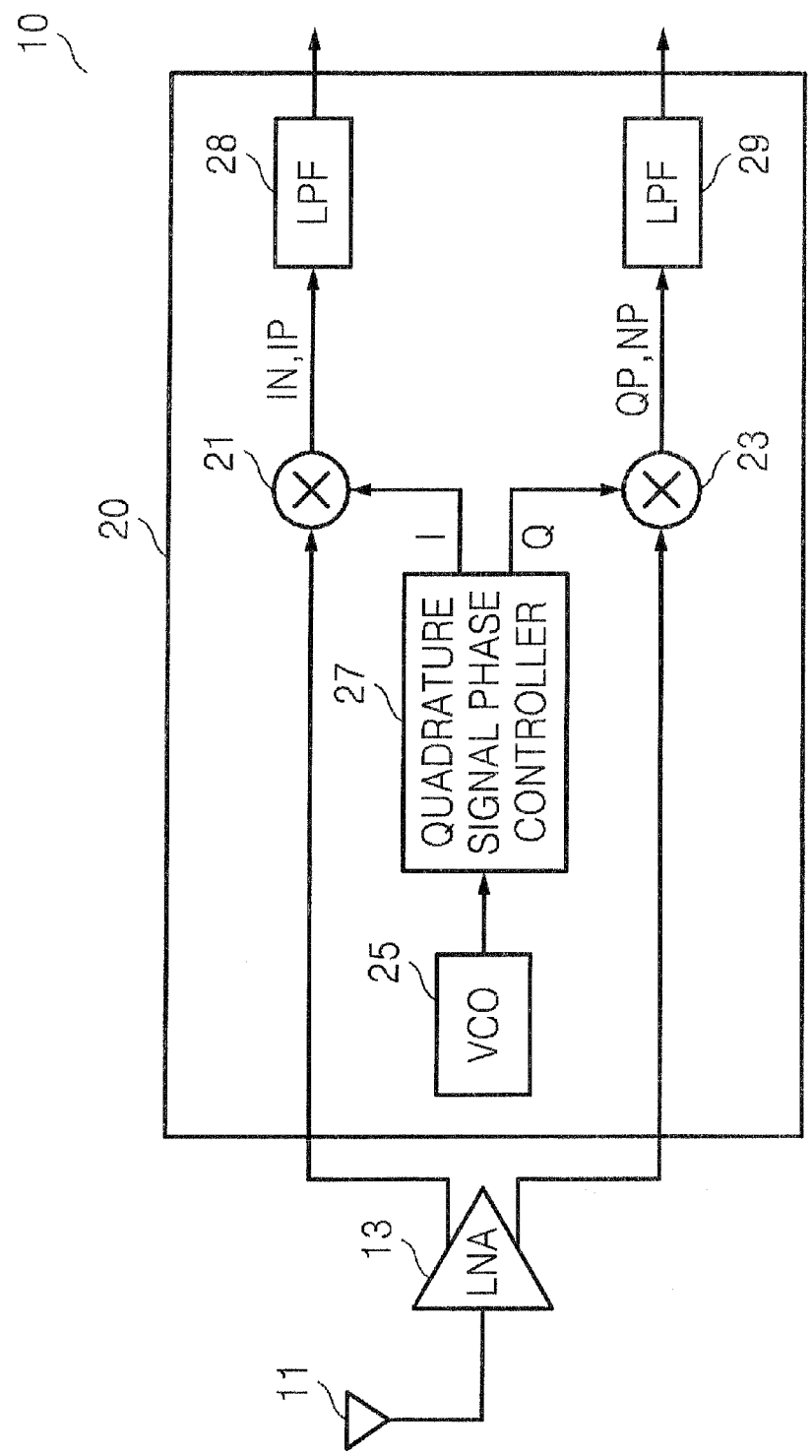
FIG. 1 is a schematic block diagram schematically of a receiver including a quadrature signal phase controller according to an exemplary embodiment of the present inventive concept.

FIG. 1 is a schematic block diagram of a receiver 10 including a quadrature signal phase controller 27 according to an exemplary embodiment of the present invention. The receiver 10 includes an antenna 11, a low-noise amplifier (LNA) 13, and a frequency conversion unit 20. For convenience of explanation, the receiver 10 including the quadrature signal phase controller 27 is described as an example, but the present inventive concept is not limited thereto. In this case, the receiver 10 may be used as an orthogonal frequency division multiplexing (OFDM) receiver, a multiband OFDM receiver, or a direct conversion receiver.

The LNA 13 receives a radio frequency (RF) signal input through the antenna 11, amplifies the received RF signal while minimizing noise thereof, and outputs a low-noise amplified signal. The frequency conversion unit 20 includes an I mixer 21 and a Q mixer 23, a voltage controlled oscillator (VCO) 25, and a quadrature signal phase controller 27. The frequency conversion unit 20 further includes a first low-pass filter (LPF) 28 and a second low-pass filter (LPF) 29.

A remote transmitter (not shown) transmits data by imposing the data on a high frequency carrier signal in which an in-phase signal component and a quadrature-phase signal component are mixed, in order to increase the bandwidth or the transmission power. Thus, the receiver 10 requires appropriate in-phase signal and quadrature-phase signal to convert an RF signal transmitted by the transmitter.

The I mixer 21 performs direct down-conversion on the frequency of the RF signal by mixing a signal output from the LNA 13 and the in-phase (I) signal output from the quadrature signal phase controller 27 (hereinafter referred to as the "I signal"), and outputs converted signals as in-phase frequency signals IP and IN. The first filter 28 receives the IP and IN output from the I mixer 21 and performs low-pass filtering thereon. The first filter 28 may be implemented as a conventional low pass filter (LPF).

The Q mixer 23 performs direct down-conversion on the frequency of the RF signal by mixing a signal output from the LNA 13 and quadrature-phase (Q) signal output from the quadrature signal phase controller 27 (hereinafter referred to as the "Q signal"), and outputs converted signals as quadrature-phase frequency signals QP and QN. The second filter 29 receives the quadrature-phase frequency signals QP and QN output from the Q mixer 23 and performs low-pass filtering thereon. The second filter 29 may be implemented as a conventional low pass filter (LPF). Each of the signals IP and IN output from the I mixer 21 and each of the signals QP and QN output from the Q mixer 23 may have the same amplitude and a phase difference of $\theta°$, where $0<\theta°<90$. For example, the signals IP and IN are differential signals or complementary signals, the signals QP and QN are differential signals or complementary signals.

Figure 2:
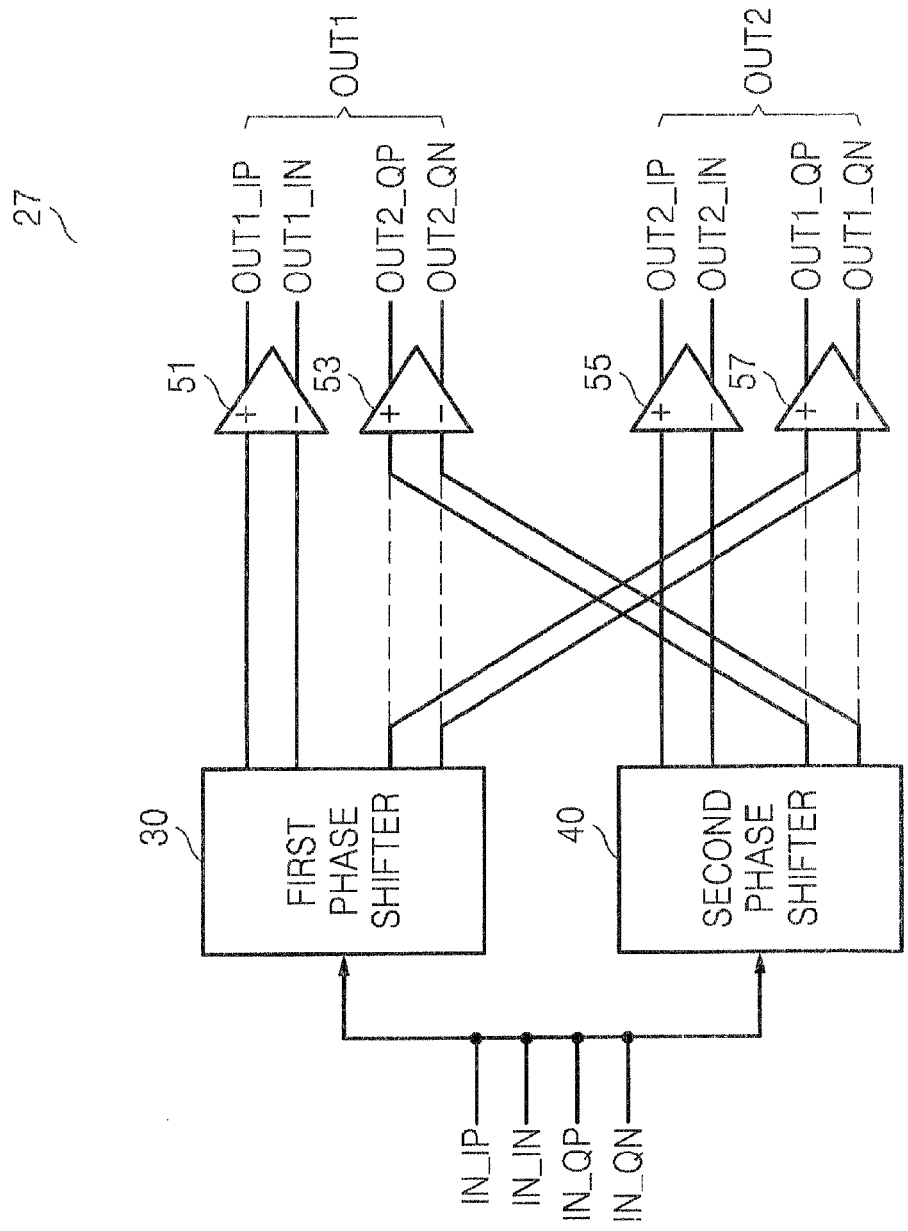
FIG. 2 is a block diagram of a quadrature signal phase controller according to an exemplary embodiment of the present inventive concept.

The voltage controlled oscillator VCO 25 generates in-phase differential input signals IN_IP and IN_IN of FIG. 2 and quadrature-phase differential input signals IN_QP and IN_QN of FIG. 2, which are used as the reference signals. The quadrature signal phase controller 27 generates the I signal and the Q signal in response to the in-phase differential input signals IN_IP and IN_IN and the quadrature-phase differential input signals IN_QP and IN_QN.

The in-phase differential input signals IN_IP and IN_IN and the quadrature-phase differential input signals IN_QP and IN_QN may have the same amplitude and a phase difference of 90°. The frequencies of the in-phase differential input signals IN_IP and IN_IN and the quadrature-phase differential input signals IN_QP and IN_QN output from the VCO 25 may be selected with consideration of the frequency of the input RF signal and the frequency to be down converted.

The receiver 10 may further include an analog-to-digital converter (ADC, not shown) and a demodulator (not shown). The analog-to-digital converter may perform analog-to-digital conversion on each of the in-phase frequency signals IP and IN and the quadrature-phase frequency signals QP and QN output from the frequency conversion unit 20 and output analog-to-digital converted in-phase digital signals and quadrature-phase digital signals. The demodulator may receive the in-phase digital signals and the quadrature-digital digital signals and perform demodulation on each of the received signals.

FIG. 2 is a block diagram of a quadrature signal phase controller 27 according to an exemplary embodiment of the present invention. Referring to FIG. 2, the quadrature signal phase controller 27 includes a first phase shifter 30, a second phase shifter 40, and a plurality of differential output buffers 51, 53, 55, and 57.

The first phase shifter 30 is configured to receive the in-phase differential input signals IN_IP and IN_IN and the quadrature-phase differential input signals IN_QP and IN_QN output from the VCO 25, and mixes each of the received in-phase differential input signals IN_IP and IN_IN and quadrature-phase differential input signals IN_QP and IN_QN to generate phase shifted first in-phase differential output signals OUT1_IP and OUT1_IN and phase shifted first quadrature-phase differential output signals OUT1_QP and OUT1_QN.

The second phase shifter 40 is configured to receive the in-phase differential input signals IN_IP and IN_IN and the quadrature-phase differential input signals IN_QP and IN_QN output from the VCO 25, and mixes each of the received in-phase differential input signals IN_IP and IN_IN and quadrature-phase differential input signals IN_QP and IN_QN to generate phase shifted second in-phase differential output signals OUT2_IP and OUT2_IN and phase shifted second quadrature-phase differential output signals OUT2_QP and OUT2_QN.

The first differential output buffer 51 receives and amplifies the first in-phase differential output signals OUT1_IP and OUT1_IN output from the first phase shifter 30, through a first input terminal (+) and a second input terminal (−) thereof, respectively, and outputs amplified signals through a first output terminal (+) and a second output terminal (−) thereof. The second differential output buffer 53 receives and amplifies the second quadrature-phase differential output signals OUT2_QP and OUT2_QN output from the second phase shifter 40, through a first input terminal (+) and a second input terminal (−) thereof, respectively, and outputs amplified signals through a first output terminal (+) and a second output terminal (−) thereof.

The third differential output buffer 55 receives and amplifies the second in-phase differential output signals OUT2_IP and OUT2_IN output from the second phase shifter 40, respectively, through a first input terminal (+) and a second input terminal (−) thereof, and outputs amplified signals through a first output terminal (+) and a second output terminal (−) thereof. The fourth differential output buffer 57 receives and amplifies the first quadrature-phase differential output signals OUT1_QP and OUT1_QN output from the first phase shifter 30, respectively, through a first input terminal (+) and a second input terminal (−) thereof, and outputs amplified signals through a first output terminal (+) and a second output terminal (−) thereof. The output signals of each of the first to fourth differential output buffers 51, 53, 55, and 57 may be differential signals or complementary signals.

The quadrature signal phase controller 27 may output any one of the output signals OUT1_IP and OUT1_IN of the first differential output buffer 51 and the output signals OUT2_IP and OUT2_IN of the third differential output buffer 55, to the I mixer 21 as the I signal, and may output any one of the output signals OUT2_QP and OUT2_QN of the second differential output buffer 53 and the output signals OUT1_QP and OUT1_QN of the fourth differential output buffer 57, to the Q mixer 23 as the Q signal.

For example, the quadrature signal phase controller 27 may transmit a first I-Q signal OUT1 including the output signals OUT1_IP and OUT1_IN of the first differential output buffer 51 and the output signals OUT2_QP and OUT2_QN of the second differential output buffer 53, to the I mixer 21 and to the Q mixer 23. Also, the quadrature signal phase controller 27 may transmit a second I-Q signal OUT2 including the output signals OUT2_IP and OUT1_IN of the third differential output buffer 55 and the output signals OUT1_QP and OUT1_QN of the fourth differential output buffer 57, to the I mixer 21 and the Q mixer 23.

The VCO 25 and the quadrature signal phase controller 27 are implemented inside the frequency conversion unit 20 in receiver 10 of FIG. 1. However, in alternative embodiments of the present invention, the VCO 25 and the quadrature signal phase controller 27 may be implemented outside the frequency conversion unit 20.

Although in the present exemplary embodiment a wireless communications system includes a single receiver for convenience of explanation, the present invention is not limited thereto. For example, when the wireless communications system includes "n" number of receivers, where "n" is a natural number, the quadrature signal phase controller 27 may transmit the first I-Q signal OUT1 to any one of the n number of receivers and the second I-Q signal OUT2 to the other ones of the n number of receivers.

Figure 3:
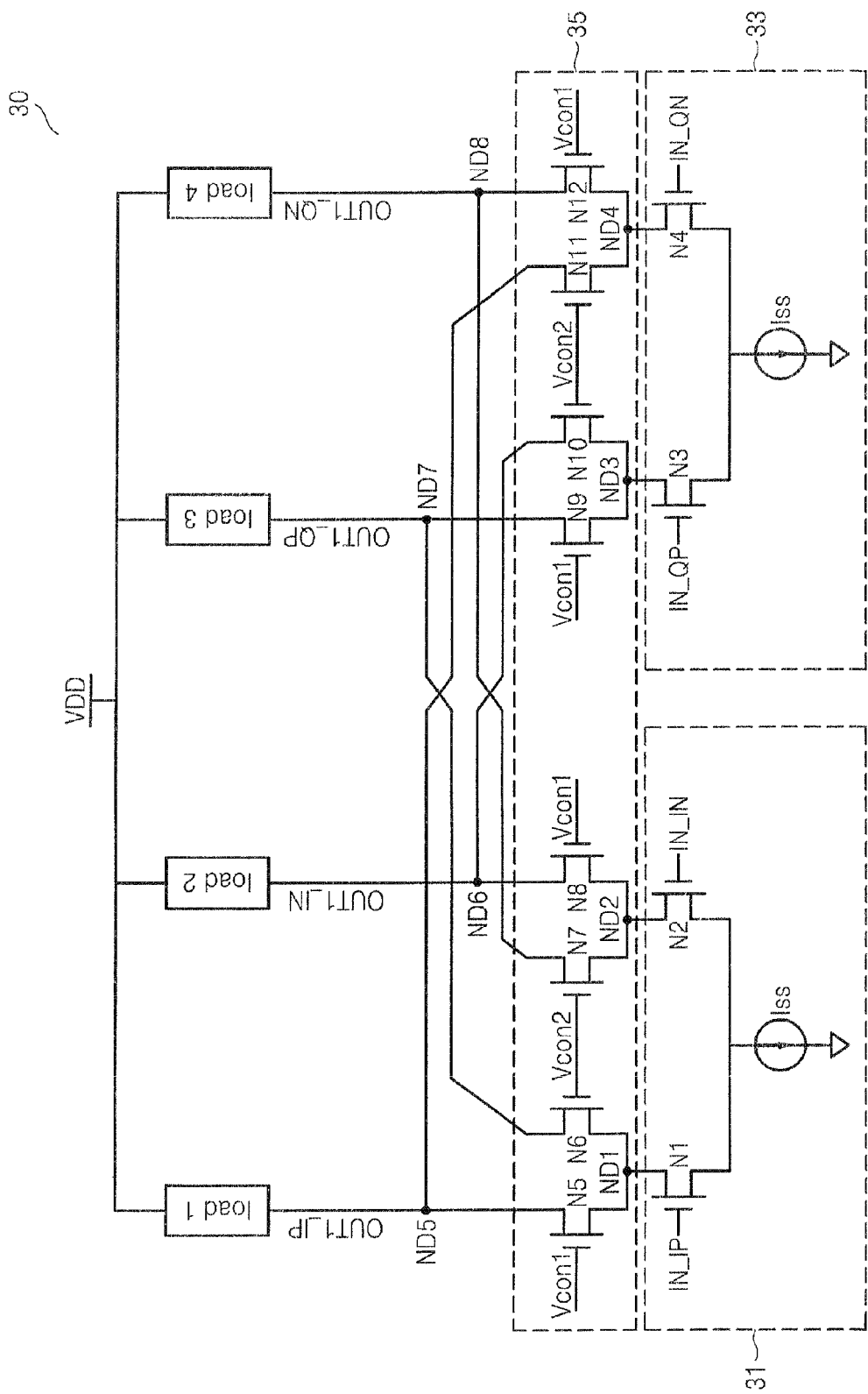
FIG. 3 is a circuit diagram of a first phase shifter 30 of FIG. 2.

FIG. 3 is a circuit diagram of the first phase shifter 30 of FIG. 2. The first phase shifter 30 of FIG. 3 may be implemented with a Gilbert cell structure using a cascade structure. Referring to FIG. 3, the first phase shifter 30 includes a first differential amplifier 31, a second differential amplifier 33, and a transistor unit 35 including a plurality of first transistors.

The first differential amplifier 31 includes a pair of transistors N1 and N2 configured to receive the in-phase differential input signals IN_IP and IN_IN, respectively, input through a first input terminal (+) (IN_IP) and a second input terminal (−) (IN_IN) thereof, and a current source Iss. Each of the output terminals of the first differential amplifier 31, for example, a first output node ND1 and a second output node ND2, is connected to a ground voltage through the current source Iss, and through the transistors N1 and N2. Thus, the first differential amplifier 31 converts the in-phase differential input signals IN_IP and IN_IN into current signals. The second differential amplifier 33 includes a pair of transistors N3 and N4 to receive the quadrature-phase differential input signals IN_QP and IN_QN, respectively, input through a third input terminal (+) (IN_QP) and a fourth input terminal (−) (IN_QN) thereof, and a current source Iss. Each of the output terminals of the second differential amplifier 33, for example, a third output node ND3 and a fourth output node ND4, is connected to a ground voltage through the current source Iss and through the transistors N3 and N4. The second differential amplifier 33 converts the quadrature-phase differential input signals IN_QP and IN_QN to current signals.

The in-phase differential input signals IN_IP and IN_IN are complementary signals, having a phase of 0° or 180°. The quadrature-phase differential input signals IN_QP and IN QN are complementary signals, having a phase of 90° or 270°. The current source Iss controls the amount of a bias current or tail current supplied to the first differential amplifier 31 and each of the transistor pairs N1 to N4 may be implemented by an NMOSFET.

The first transistors (or switches) 35, in response to a first control signal Vcon1, control the connection of each of the output terminals ND1 and ND2 of the first differential amplifier 31 and each of first output terminals ND5 and ND6 to output the first in-phase differential output signals. The first transistors 35, further control the connection of each of the output terminals ND3 and ND4 of the second differential amplifier 33 and each of second output terminals ND7 and ND8 to output the first quadrant-phase differential output signals.

The first transistors 35 include a plurality of transistor pairs N5 and N6, N7 and N8, N9 and N10, and N11 and N12. The transistor pairs consist of first transistors N5, N8, N9, and N12 gated in response to the first control signal Vcon1 and second transistors N6, N7, N10, and N11 gated in response to a second control signal Vcon2.

The first transistors N5, N8, N9, and N12 are connected between the output terminals ND1 and ND2 of the first differential amplifier 31 and the first output terminals ND5 and ND6, and between the output terminals ND3 and ND4 of the second differential amplifier 33 and the second output terminals ND7 and ND8. The second transistors N6, N7, N10, and N11 are connected between the output terminals ND1 and ND2 of the first differential amplifier 31 and the second output terminals N7 and ND8, and between the output terminals ND3 and ND4 of the second differential amplifier 33 and the first output terminals ND5 and ND6.

Each of the in-phase differential input signals IN_IP and IN_IN and the quadrature-phase differential input signals IN_QP and IN_QN is branched by the first transistors 35 driven by the first and second control signals Vcon1 and Vcon2, into the first output terminals ND5 and ND6 and the second output terminals ND7 and ND8. Thus, the output signal of each of first output terminals ND5 and ND6 and the second output terminals ND7 and ND8 is a signal in which the in-phase differential input signals IN_IP and IN_IN and the quadrature-phase differential input signals IN_QP and IN_QN are mixed.

For example, the first in-phase differential output signal OUT1_IP is the sum of the in-phase differential input signal IN_IP and the quadrature-phase differential input signal IN_QN; the first in-phase differential output signal OUT1_IN is the sum of the in-phase differential input signal IN_IN and the quadrature-phase differential input signal IN_QP; the first quadrature-phase differential output signal OUT1_QP is the sum of the quadrature-phase differential input signal IN_QP and the in-phase differential input signal IN_IP; and the first quadrature-phase differential output signal OUT1_QN is the sum of the quadrature-phase differential input signal IN_QN and the in-phase differential input signal IN_IN. Each of the first in-phase differential output signals OUT1_IP and OUT1_IN and the first quadrature-phase differential output signals OUT1_QP and OUT1_QN has a phase difference of 90° from each other.

A controller (not shown) outputs the first control signal Vcon1 and the second control signal Vcon2 to control the operation of the receiver 10. The voltage difference between the voltage level of the first control signal Vcon1 and the voltage level of the second control signal Vcon2 is variably controlled based on the setting of a special function resistor (SFR) or an internal input/output signal. The sum of the voltage level of the first control signal Vcon1 and the voltage level of the second control signal Vcon2 may be constant.

For example, when the voltage level of the first control signal Vcon1 increases, the voltage level of the second control signal Vcon2 may decrease as much as the voltage level of the first control signal Vcon1 increases. When the voltage level of the first control signal Vcon1 decreases, the voltage level of the second control signal Vcon2 may increase as much as the voltage level of the first control signal Vcon1 decreases. As described above, the quadrature signal phase controller 27 generates the in-phase differential output signal and the quadrature-phase differential output signal having a phase difference of 90°, by using reference signals output from the VCO 25.

Figure 4:
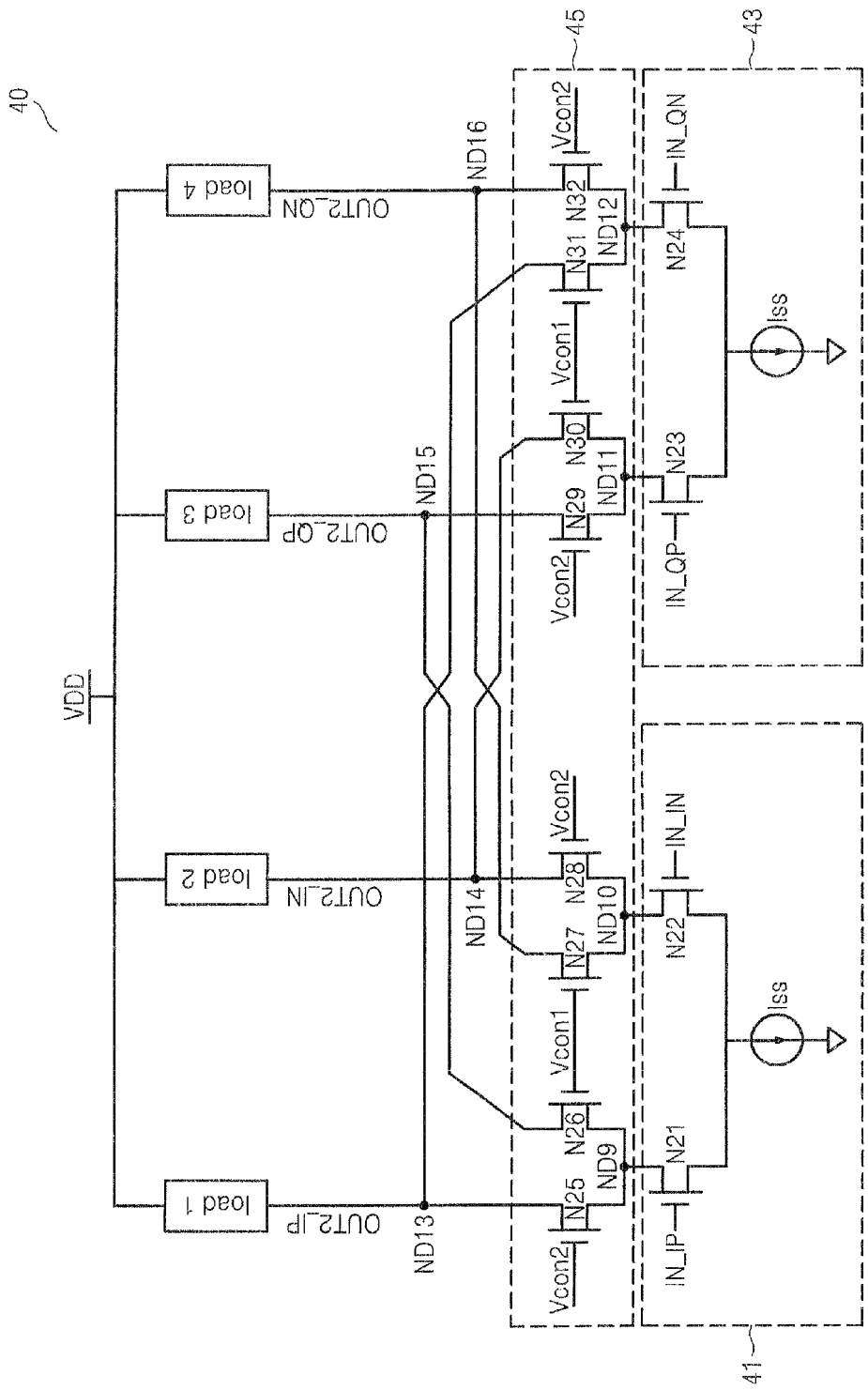
FIG. 4 is a circuit diagram of a second phase shifter 40 of FIG. 2.

FIG. 4 is a circuit diagram of the second phase shifter 40 of FIG. 2. Referring to FIG. 4, the second phase shifter 40 includes a third differential amplifier 41, a fourth differential amplifier 43, and a plurality of second transistors 45. The structure of the second phase shifter 40 of FIG. 4 is substantially the same as that of the first phase shifter 30 of FIG. 3, except that the second transistors 45 and the second phase shifter 40 receives the first and second control signals Vcon1 and Vcon2 reversely.

Each of the second transistors (or switches) 45, in response to the second control signal Vcon2, controls the connection between each of the output terminals ND9 and ND10 of the third differential amplifier 41 and each of third output terminals ND13 and ND14 to output the second in-phase differential output signals OUT2_IP and OUT2_IN; the connection between each of the output terminals ND11 and ND12 of the fourth differential amplifier 43 and each of fourth output terminals ND15 and ND16 to output the second quadrant-phase differential output signals OUT2_QP and OUT2_QN.

While the first and second phase shifters 30 and 40 have substantially the same structure and receive the same input signals, since the first and second control signals Vcon1 and Vcon2 are reversely applied to the first transistors 35 of the first phase shifter 30 and the second transistors 45 of the second phase shifter 40, the first and second phase shifters 30 and 40 operate complementarily.

For example, according to a change in the level of the first control signal Vcon1 and the level of the second control signal Vcon2, when the phases of the output signals OUT1_IP, OUT1_IN, OUT1_QP, and OUT1_QN output from the first phase shifter 30 increase, the phases of the output signals OUT2_IP, OUT2_IN, OUT2_QP, and OUT2_QN output from the second phase shifter 40 may gradually increase.

Figure 5A:
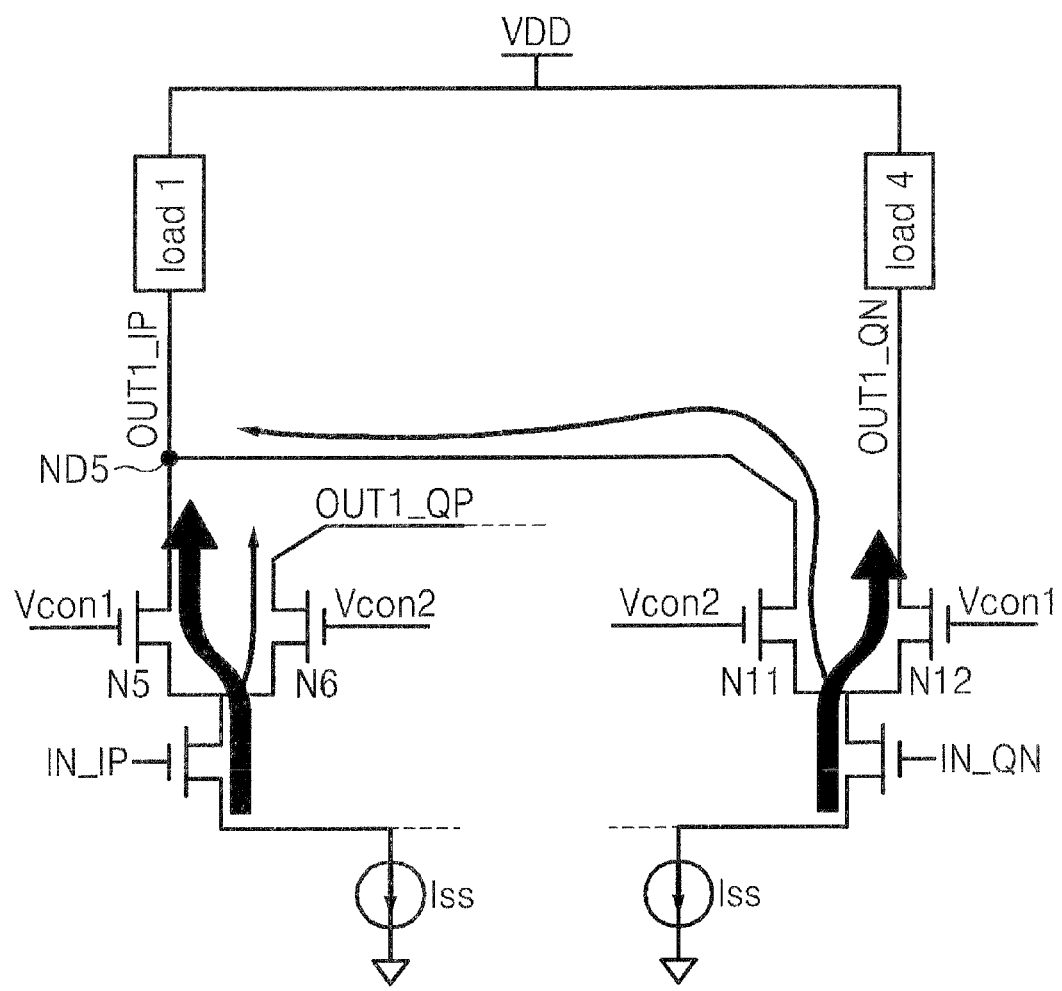
FIG. 5A is a signal path and circuit diagram for explaining the operation in which the first phase shifter 30 of the present inventive concept generates a phase shifted signal by mixing an in-phase differential input signal and a quadrature-phase differential input signal.
Figure 5B:
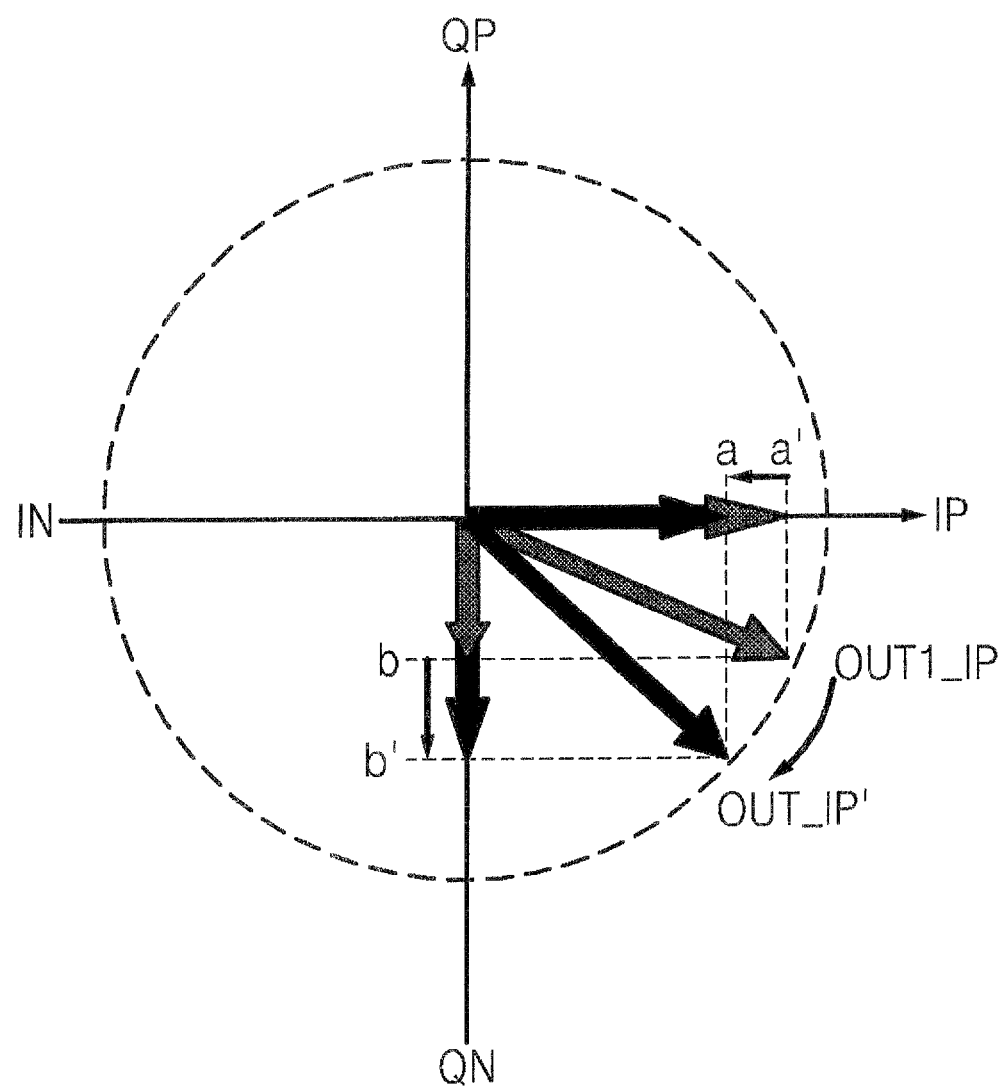
FIG. 5B is a graph showing the relationship of a phase between an input signal and an output signal shown in FIG. 5A.

FIG. 5A is a signal path and a portion of the circuit diagram of FIG. 3 for explaining the operation in which the first phase shifter 30 of the present invention generates a phase shifted signal by mixing an in-phase differential input signal and a quadrature-phase differential input signal. FIG. 5B is a graph showing the relationship of the phase between an input signal and an output signal shown in FIG. 5A. For convenience of explanation, an example in which the first phase shifter 30 generates the phase shifted in-phase differential output signal OUT1_IP by mixing the in-phase differential input signal IN_IP and the quadrature-phase differential input signal IN_QN is described below.

In the first differential amplifier 31, the first transistor N1, in response to the first control signal Vcon1, forms a current path between the first node ND1 and the first output terminal ND5 and outputs a part of a current to the first output terminal ND5. Also, the second transistor N2, in response to the second control signal Vcon2, forms a current path between the first node ND1 and the second output terminal ND7 and outputs a part of a current to the second output terminal ND7. Thus, a current generated by the in-phase differential input signal IN_IP is output by being branched into the first output terminal ND5 and the second output terminal ND7 according to the voltage difference between the level of the first control signal Vcon1 and the level of the second control signal Vcon2. The amount of the current outputs to the first output terminal ND5 and the amount of the current outputs to the second output terminal ND7 are determined according to the voltage difference between the first control signal Vcon1 and the second control signal Vcon2.

In the second differential amplifier 33, the first transistor N12, in response to the first control signal Vcon1, forms a current path between the fourth node ND4 and the second output terminal ND8 and outputs a part of a current to the second output terminal ND8. Also, the second transistor N11, in response to the second control signal Vcon2, forms a current path between the fourth node ND4 and the first output terminal ND5 and outputs a part of a current to the first output terminal ND5. Thus, a current generated by the quadrature-phase differential input signal IN_QN is output by being branched into the fifth node ND5 and the eighth node ND8 according to the voltage difference between the level of the first control signal Vcon1 and the level of the second control signal Vcon2.

Accordingly, the first in-phase differential output signal OUT1_IP wherein phase shifted is generated at the first output terminal ND5 by summing the in-phase differential input signal IN_IP and the quadrature-phase differential input signal IN_QN. The phase of the first in-phase differential output signal OUT1_IP may be varied according to the difference in the amplitude between the in-phase differential input signal IN_IP and the quadrature-phase differential input signal IN_QN.

For example, when the voltage of the first control signal Vcon1 is higher than the voltage of the second control signal Vcon2, the amplitude (a) of the in-phase differential input signal IN_IP output through the first transistor N5 is greater than the amplitude (b) of the quadrature-phase differential input signal IN_QN output through the second transistor N11. In this case, as illustrated in FIG. 5B, the phase shifted in-phase differential output signal OUT1_IP is generated according to the amplitude (a) of the in-phase differential input signal IN_IP and the amplitude (b) of the quadrature-phase differential input signal IN_QN.

Next, the amplitude (b) of the quadrature-phase differential input signal IN_QN output through the second transistor N11 increases (or decreases) as the voltages of the first and second control signals Vcon1 and Vcon2 variably change, as much as the amplitude (a) of the in-phase differential input signal IN_IP output through the first transistor N5 decreases (or increases). For example, when the level of the second control signal Vcon2 increases or the level of the first control signal Vcon1 decreases, the amplitude (a') of the in-phase differential input signal IN_IP output through the first transistor N5 decreases and the amplitude (b') of the quadrature-phase differential input signal IN_QN output through the second transistor N11 increases. In this case, as illustrated in FIG. 5B, the phase of an in-phase differential output signal OUT_IP' may be increased clockwise.

As described above, the receiver 10 according to the present exemplary embodiment may control the phases of the output signals according to the difference in the phase and amplitude of input signals, e.g., the in-phase differential input signals IN_IP and IN_IN and the quadrature-phase differential input signal IN_QP and IN_QN, which are variable according to the voltage difference between the first control signal Vcon1 and the second control signal Vcon2. The other in-phase differential output signals OUT1_IN and the quadrature-phase differential output signals OUT1_QP and OUT1_QN may generate output signals by mixing the input signals, e.g., the in-phase differential input signals IN_IP and IN_IN and the quadrature-phase differential input signal IN_QP and IN_QN, in the same manner as described above.

Figure 6A:
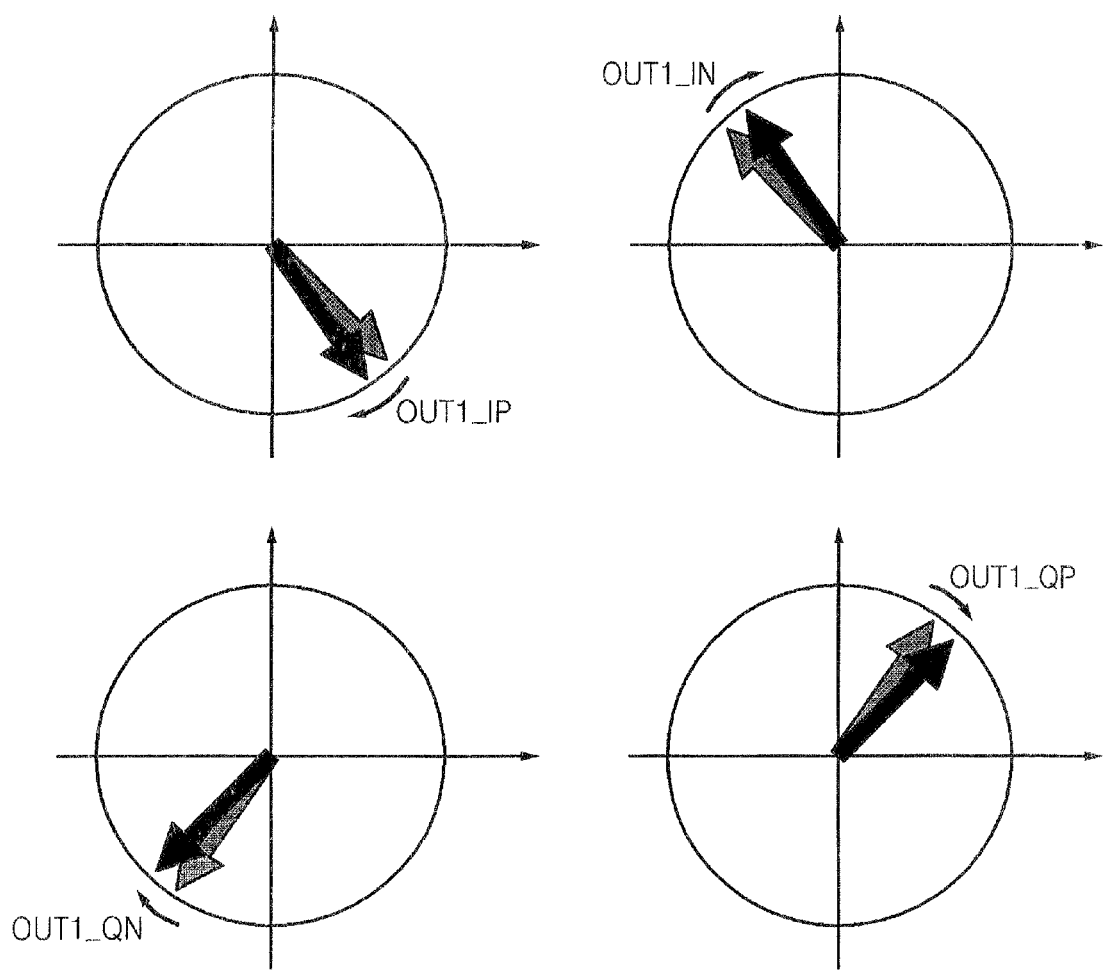
FIG. 6A is a graph showing the phases of an output signal of the first phase shifter of FIG. 3.
Figure 6B:
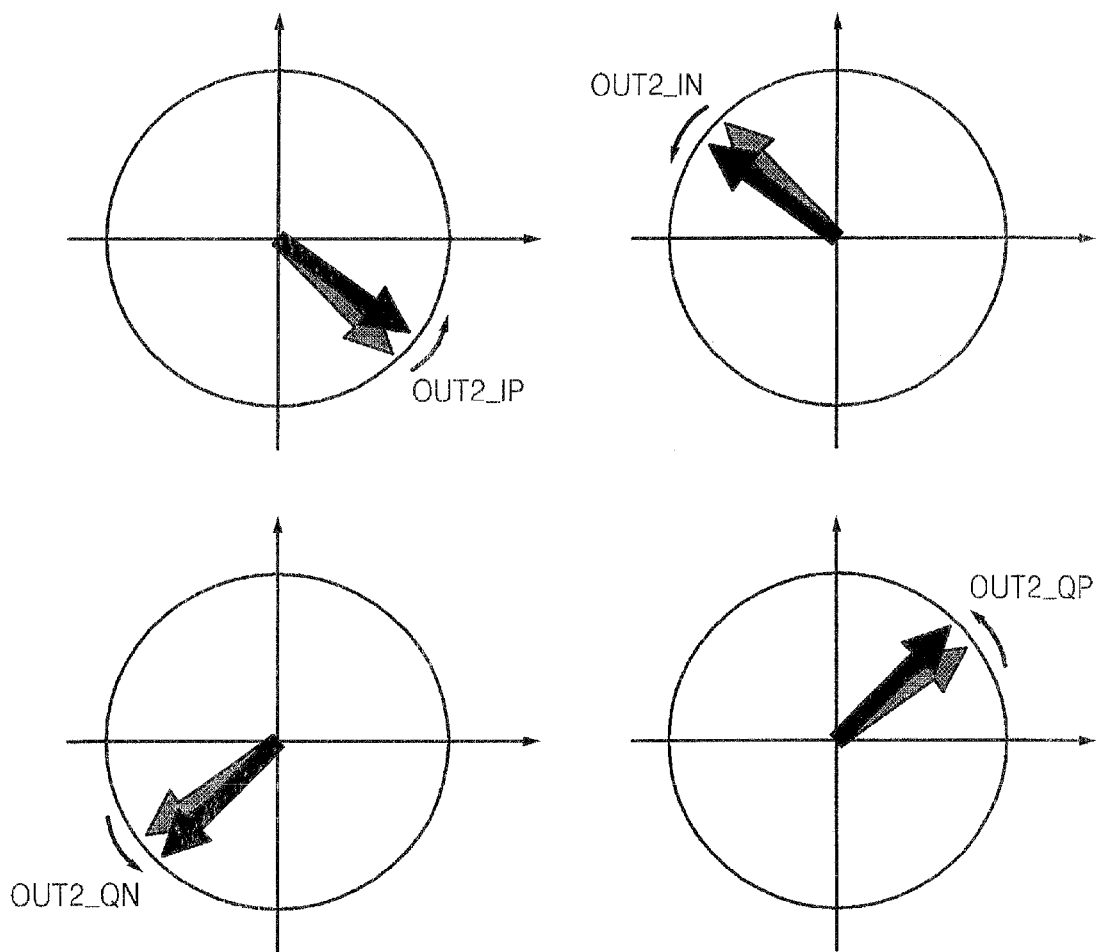
FIG. 6B is a graph showing the phases of an output signal of the second phase shifter of FIG. 4.

FIG. 6A is a graph showing the phases of an output signal of the first phase shifter 30 of FIG. 3. FIG. 6B is a graph showing the phases of an output signal of the second phase shifter 40 of FIG. 4. Referring to FIG. 6A, the first phase shifter 30 generates, for example, the first in-phase differential output signals OUT1_IP and OUT1_IN and the first quadrature-phase differential output signals OUT1_QP and OUT1_QN, which are phase shifted by mixing the in-phase differential input signals IN_IP and IN_IN and the quadrature-phase differential input signal IN_QP and IN_QN. When the level of the second control signal Vcon2 gradually increases and the level of the first control signal Vcon1 decreases, the amplitude of the signal output through the first transistor gradually decreases and the amplitude of the signal output through the second transistor gradually increases and thus, each of the output signals of the first phase shifter 30 rotates clockwise.

Referring to FIG. 6B, the second phase shifter 40 operates complementarily with respect to the first phase shifter 30 (FIG. 6A) generates, for example, the second in-phase differential output signals OUT2_IP and OUT2_IN and the second quadrature-phase differential output signals OUT2_QP and OUT2_QN, which are phase shifted by mixing the in-phase differential input signals IN_IP and IN_IN and the quadrature-phase differential input signal IN_QP and IN_QN. Then, when the level of the second control signal Vcon2 gradually increases and the level of the first control signal Vcon1 decreases, the amplitude of the signal output through the first transistor gradually increases and the amplitude of the signal output through the second transistor gradually decreases thus, each of the output signals of the second phase shifter 40 rotates counterclockwise.

Figure 7A:
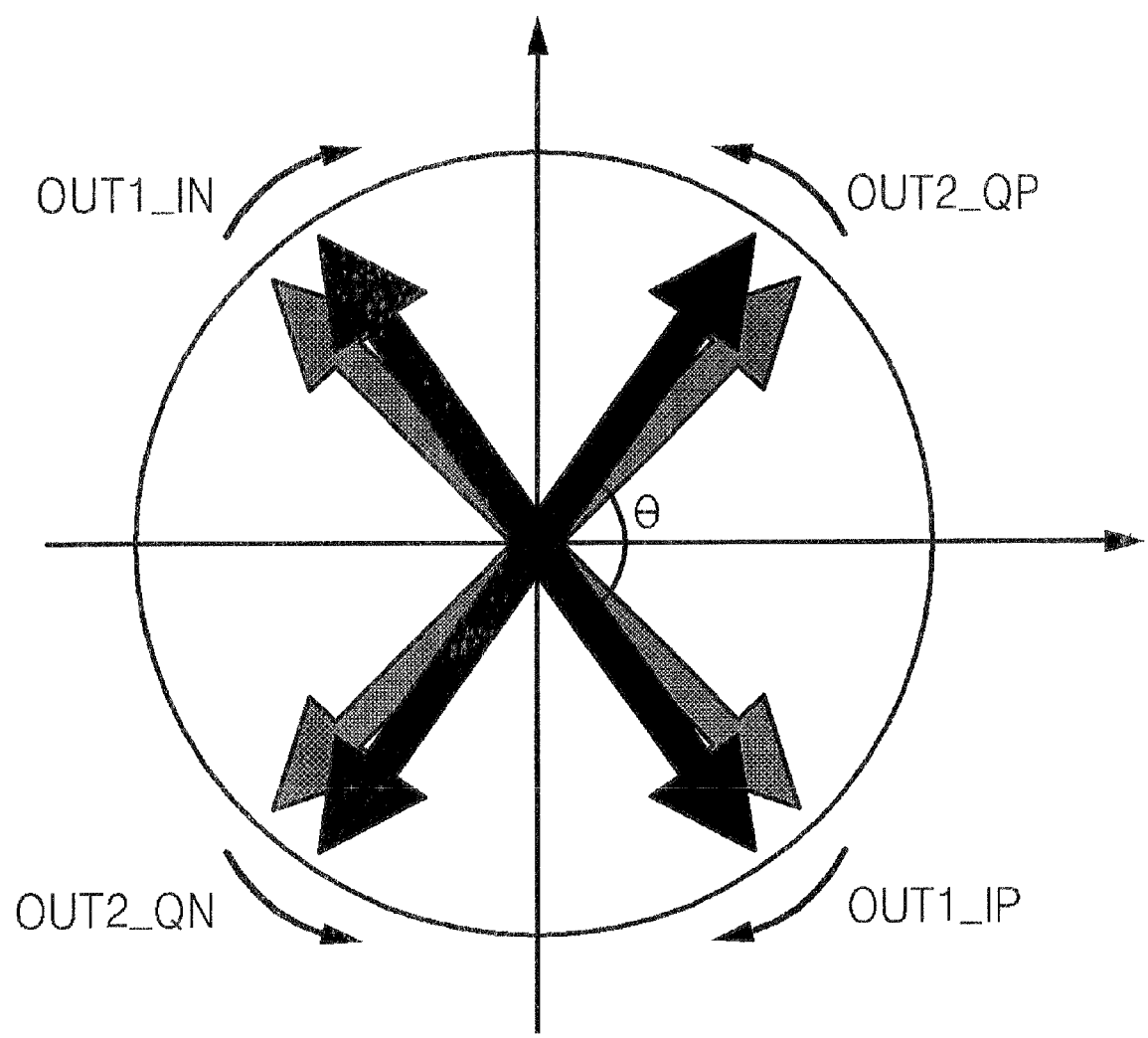
FIG. 7A is a graph showing an example of the phases of an output signal of a quadrature signal phase controller including the first and second phase shifters.
Figure 7B:
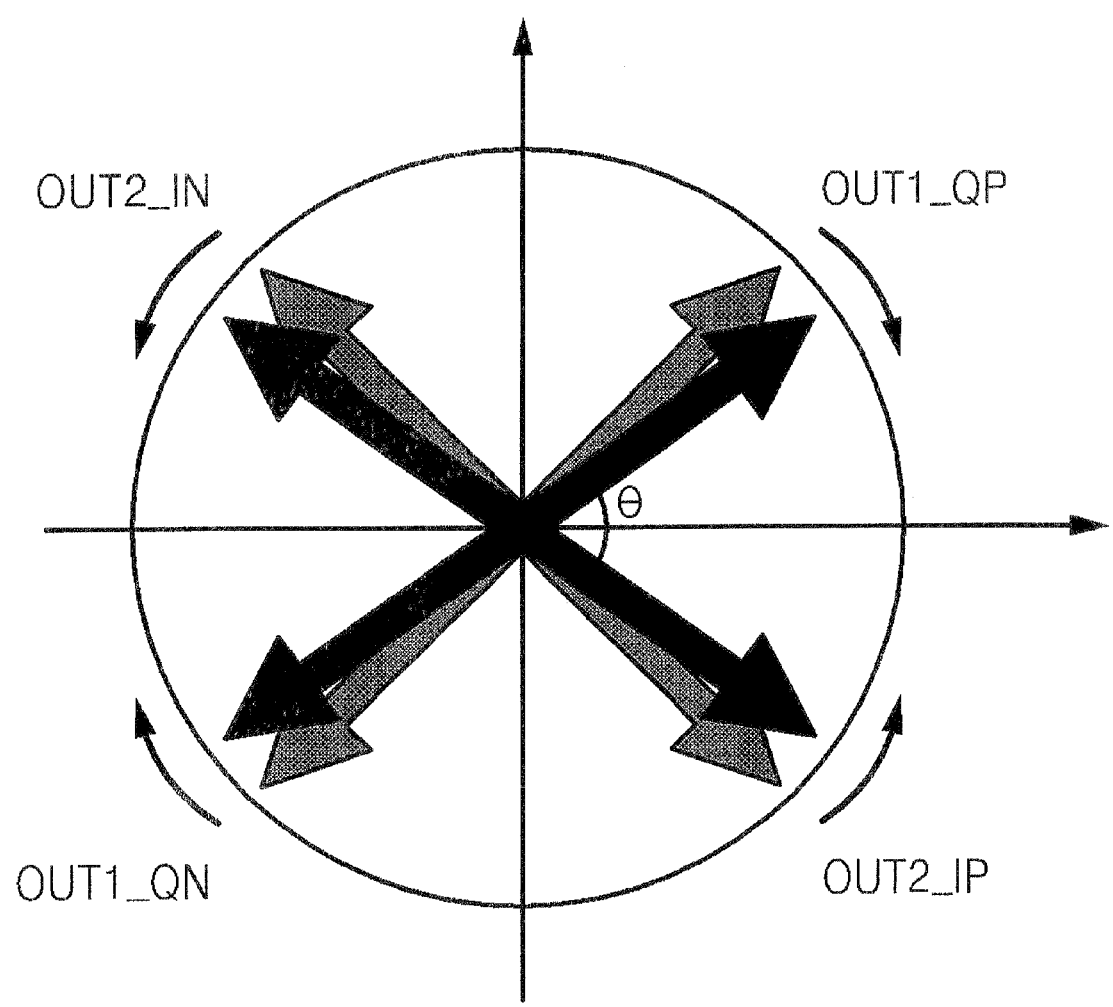
FIG. 7B is a graph showing another example of the phases of an output signal of a quadrature signal phase controller including the first and second phase shifters.

FIG. 7A is a graph showing an example of the phases of an output signal of a quadrature signal phase controller including the first and second phase shifters 30 and 40. FIG. 7B is a graph showing another example of the phases of an output signal of a quadrature signal phase controller including the first and second phase shifters 30 and 40. FIG. 7A illustrates the phases of the first I-Q signal OUT1 including the first in-phase differential output signals OUT1_IP and OUT1_IN and the second quadrature-phase differential output signals OUT2_QP and OUT2_QN. FIG. 7B illustrates the phases of the second I-Q signal OUT2 including the second in-phase differential output signals OUT2_IP and OUT2_IN and the first quadrature-phase differential output signals OUT1_QP and OUT1_QN.

As illustrated in FIG. 7A, when the level of the second control signal Vcon2 increases and the level of the first control signal Vcon1 decreases, each of the first in-phase differential output signals OUT1_IP and OUT1_IN rotates clockwise and each of the second quadrature-phase differential output signals OUT2_QP and OUT2_QN rotates counterclockwise. Accordingly, the frequency conversion unit 20 may gradually increase the phase difference θ between the first in-phase differential output signals OUT1_IP and OUT1_IN and the second quadrature-phase differential output signals OUT2_QP and OUT2_QN.

Also, as illustrated in FIG. 7B, when the level of the second control signal Vcon2 increases and the level of the first control signal Vcon1 decreases, each of the second in-phase differential output signals OUT2_IP and OUT2_IN rotates counterclockwise and each of the first quadrature-phase differential output signals OUT1_QP and OUT1_QN rotates clockwise. Accordingly, the frequency conversion unit 20 may gradually decrease the phase difference θ between the second in-phase differential output signals OUT2_IP and OUT2_IN and the first quadrature-phase differential output signals OUT1_QP and OUT1_QN.

As described above, the quadrature signal phase controller 27 uses two phase shifters capable of controlling phases in different directions to variably control the phase difference θ between the in-phase signal and the quadrature-phase signal so that an image rejection ratio of the receiver 10 may be improved. Also, the quadrature signal phase controller according to the present exemplary embodiment precisely controls the quadrature relationship between the in-phase signal and the quadrature-phase signal by variably and continuously adjusting the phases of the in-phase signal and the quadrature-phase signal suitable for a system environment, so that a precise characteristic control with respect to the operation of the system may be possible.

The technical concept of the present invention is not limited to the receiver 10 including the quadrature-phase signal controller 27 and may be applied to all RF systems which perform frequency mixing by using the in-phase signal and the quadrature-phase signal.

As described above, since the quadrature signal phase controller according to the present invention variably and continuously controls the phases between the in-phase signal and the quadrature-phase signal, an image rejection ratio of a receiver may be improved. Also, in a quadrature signal phase controller according to an embodiment of the present invention, when the operation of the system is controlled by variably controlling the phases of the in-phase signal and the quadrature-phase signal suitable for a system environment, a precise characteristic control with respect to the system may be performed.

While the inventive concept has been particularly shown and described with reference to exemplary embodiments thereof, it will be understood that various changes in form and details may be made therein without departing from the spirit and scope of the following claims.

What is claimed is:

1. A receiver comprising:
   a first phase shifter mixing each of in-phase differential input signals and each of quadrature-phase differential input signals, in response to at least any one of a first control signal and a second control signal, to generate phase shifted first in-phase differential output signals and phase shifted first quadrature-phase differential output signals;
   a second phase shifter, mixing each of the in-phase differential input signals and each of the quadrature-phase differential input signals, in response to at least any one of the first control signal and the second control signal, to generate phase shifted second in-phase differential output signals and phase shifted second quadrature-phase differential output signals;
   a low-noise amplifier (LNA) receiving a radio frequency (RF) signal output from an antenna, amplifying the received RF signal and outputting a low-noise amplified signal;
   an I mixer mixing the low-noises amplified signal and any one of the phase shifted first in-phase differential output signals and the phase shifted second in-phase differential output signals and outputting converted signals as in-phase frequency signals; and
   a Q mixer mixing the low-noise amplified signal and any one of the phase shifted first quadrature-phase differential output signals and the phase shifted second quadrature-phase differential output signals and outputting converted signals as quadrature-phase frequency signals;
   wherein each of the first and second phase shifters, in response to a change in a level of the first control signal and a change in a level of the second control signal, increases or decreases the phase difference between the first in-phase differential output signals and the second quadrature-phase differential output signals, and the phase difference between the second in-phase differential output signals and the first quadrature-phase differential output signals.

2. The receiver of claim 1, wherein the first phase shifter comprises:
   a first differential amplifier including input terminals configured to receive the in-phase differential input signals;
   a second differential amplifier including input terminals configured to receive the quadrature-phase differential input signals; and
   a plurality of first transistors, each controlling, in response to the first control signal, connection between each of output terminals of the first differential amplifier and each of first output terminals to output the first in-phase differential output signals, and connection between each of output terminals of the second differential amplifier and each of second output terminals to output the first quadrature-phase differential output signals.

3. The receiver of claim 2, wherein the second phase shifter comprises:
   a third differential amplifier including input terminals configured to receive the in-phase differential input signals;
   a fourth differential amplifier including input terminals configured to receive the quadrature-phase differential input signals; and
   a plurality of second transistors, each controlling, in response to the second control signal, connection between each of output terminals of the third differential amplifier and each of third output terminals to output the second in-phase differential output signals, and connection between each of output terminals of the fourth differential amplifier and each of fourth output terminals to output the second quadrature-phase differential output signals.

4. The receiver of claim 2, wherein each of the plurality of first transistors of the first phase shifter, in response to the second control signal, controls the quadrature-phase differential input signals forming at least part of the first in-phase differential output signals, and the in-phase differential input signals forming at least part of the first quadrature-phase differential output signals.

5. The receiver of claim 3, wherein each of the plurality of second transistors of the second phase shifter, in response to the first control signal, controls the quadrature-phase differential input signals forming at least part of the second in-phase differential output signals, and the in-phase differential input signals forming at least part of the second quadrature-phase differential output signals.

6. The receiver of claim 1, wherein the change in the level of the first control signal and the change in the level of the second control signal are variably controlled and the sum of the first and second control signals is constant.

7. The receiver of claim 1, wherein the change in the level of the first control signal and the change in the level of the second control signal are variably controlled and the sum of the square of the first control signal plus the square of the second control signals is constant.

8. The receiver of claim 1, wherein the receiver is an orthogonal frequency division multiplexing (OFDM) receiver.

9. The receiver of claim 1, wherein the receiver is a multi-band orthogonal frequency division multiplexing (OFDM) receiver.

10. The receiver of claim 1, wherein the receiver is a direct conversion receiver.

11. The receiver of claim 1,
    where the I mixer performs direct down-conversion on a frequency of the RF signals by mixing the low-noise amplified signal and the any one of the phase shifted first in-phase differential output signals and the phase shifted second in-phase differential output signals and outputting the converted signals as the in-phase frequency signals.

12. The receiver of claim 1,
    wherein the Q-mixer performs direct down-conversion on a frequency of the RF signals by mixing the low-noise amplified signal and the any one of the phase shifted first quadrature-phase differential output signals and the phase shifted second quadrature-phase differential output signals and outputting the converted signals as the quadrature-phase frequency signals.

13. The receiver of claim 1, further comprising a voltage controlled oscillator outputting the in-phase differential input signals and the quadrature-phase differential input signals.

14. The receiver of claim 1, wherein each of the in-phase frequency signals output from the I mixer and each of quadrature-phase frequency signals output from the Q mixer have the same amplitude and a phase difference of θ°, where 0<θ°<90.

* * * * *